Sept. 3, 1935.    K. D. LOOSE    2,013,003

CEREAL FOOD

Filed July 31, 1931

Patented Sept. 3, 1935

2,013,003

UNITED STATES PATENT OFFICE 2,013,003

CEREAL FOOD

Kenneth D. Loose, Bronxville, N. Y., assignor to Loose-Wiles Biscuit Company, Long Island City, N. Y., a corporation of New York Application July 31, 1931, Serial No. 554,302

6 Claims. (Cl. 99—10)

The invention is an improved cereal food product, of the breakfast food type, adapted to be served with milk or cream and to be eaten with a spoon and not requiring preparatory crushing. The new product is composed of small blocks, lozenges, pieces or biscuits, preferably of a size to go in a spoon, each composed of a plurality of built-up layers of substantially parallel cereal filaments, the adjacent layers being laid at angles to each other, so that the entire structure is thus composed of closely related criss-crossed filaments, providing a small porous biscuit adapted to absorb, or be quickly filled with the milk or cream, because of the interstitial porosity produced by the criss-crossing, and being for the same reason easily chewed and in addition attractive and distinctive in appearance because of the diagonal direction of the top layer filaments. The invention also includes the method of producing the new article.

Figure 1:
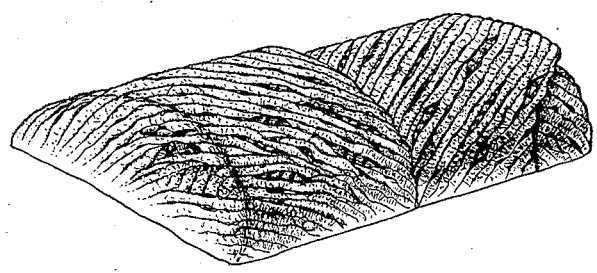
Figure 2:
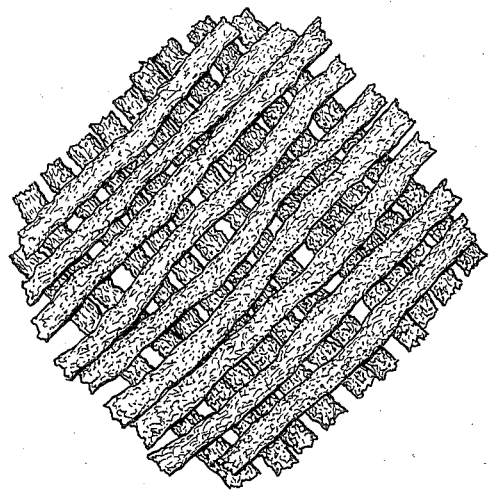

The drawing hereof illustrates the preferred embodiment of the invention, Fig. 1 being a perspective in somewhat enlarged scale with some of the filament layers removed from one end to show the angular arrangement, and Fig. 2 being a magnified view illustrating the texture of the material.

The filament layers can be made of any appropriate cereal substance or dough, for instance whole wheat, and can be produced, according to the process of Patent No. 548,086, in a shredder, such as well-known in the art and shown for example in Patent No. 502,378. According to this well-known process a dough of whole wheat berries is extruded through and by a pair of co-acting rollers, one of which is circumferentially scored with fine closely related grooves and the other smooth. The dough is crowded into these grooves by the rotation of the rollers and removed therefrom on the opposite side as a sheet of fine parallel filaments which are more or less separate from each other according to the closeness at which the rollers are operated. When the rollers are held to roll in mutual contact, the filaments will be fairly separate from each other, though more or less contacting, but when the rollers are sprung slightly apart, under the pressure, the adjacent filaments may be more or less united to each other by very thin translucent, almost transparent, webs or fins between them. Such sheets or layers of filaments are deposited on a suitable surface, a conveyor belt for example, in super-position and each successive layer is laid with its filaments running at an angle to those of the layer below as indicated in an approximate way in Fig. 2, an angle of 90° being suitable. Out of a sheet of about eight such layers, the biscuits are stamped or cut by the use of cutting dies, such for example as used for cutting out small crackers, adapted to give each the desired contour. The shape is preferably rectangular as shown, the bottom of the biscuit being flat incident to its being cut while resting on a flat conveyor belt and the top surface being rounded or domed, which may be incident to the shape of the cutting die. In general, the preferred shape may be said to be that of a cylindrical segment. The act of cutting out the biscuit slightly compresses the filaments of adjacent layers together, add somewhat more at the margin of the biscuit than elsewhere, so that they become slightly welded together at their crossing points, the compression being just sufficient to unite the layers so that they do not later easily fall apart but without compacting them so much as to impair the criss-cross porosity, which it is the purpose to preserve to the greatest extent. By proper proportioning of the filament size and number of criss-crossed layers to the depth of the cutting die, the biscuit can easily be produced with the qualities above stated. After they have been thus cut out, the biscuits are passed to an oven and there baked or browned to crispness, thus setting the union at the crossing points as well as along the margins and are then ready to be packaged for the market.

It will be apparent that within these specifications the shape of the biscuit is subject to variation, as well as its size. The proximity of adjacent filaments to each other, in the same layer, is also subject to variation, controlled by selecting a proper spacing for the grooves of the shredding roll or other machine in which the filaments are produced. They will, in any event, be more or less joined to each other in the finished product either by virtue of the thin intervening webs above alluded to or by their occasional contact with each other when they are not united by the webs, such contacts being cemented and becoming points of attachment by the effect of the baking, and in all cases the effect of the criss-crossing is to produce a substantially homogeneously porous biscuit with special tenderness and easy granulation. The criss-crossing also tends to shorten the time required for desiccation and this in turn tends to retain the flavor of the wheat in maximum degree.

It should be pointed out that it is undesirable that the margins of the biscuit should be so compacted together as to produce after baking a hard seam or edge difficult to chew and that in accordance with the procedure above outlined, and particularly by the selection of the proper filament size and number of layers, in reference to the shape of the cutting die, this effect can be readily avoided and without making the biscuit too friable, since the layers are held together by the criss-cross contacts above referred to throughout the biscuit body.

Having described the invention, the following is claimed:

1. As a new food product, a biscuit of porous texture throughout its mass composed of superposed criss-crossed united layers of numerous thread-like, and substantially parallel filaments.

2. As a new food product, a porous biscuit composed of superposed layers of numerous fine, substantially parallel cereal filaments, the adjacent layers being laid in criss-cross relation and welded together along the margins of the biscuit.

3. As a new food product, a rectangular or oblong spoon-size biscuit composed of a substantially homogeneously porous mass of numerous closely spaced cereal filaments and having a domed top, one of the surfaces of the biscuit being composed of numerous parallel filaments extending diagonally of the biscuit.

4. The method of making biscuits of the kind described, comprising building up a dough-sheet by superposing layers of fine-substantially parallel and closely spaced filaments of cereal-dough, with the filaments of successive layers at an angle to the filaments of the layer below, cutting biscuits from such sheet and slightly compacting the same to weld the layers together at the crossing points of the filaments and then baking said biscuits.

5. As a new food product, a biscuit of porous texture throughout its mass composed of superposed criss-crossed united layers of fine, and substantially parallel filaments, some of the adjacent filaments in the layers being attached to each other.

6. As a new food product, a porous biscuit composed of superposed layers of fine, substantially parallel cereal filaments, the adjacent layers being laid in criss-cross relation and welded together along the margins of the biscuit, and also at their crossing contacts.

KENNETH D. LOOSE.